United States Patent [19]

Muller

[11] 4,285,050
[45] Aug. 18, 1981

[54] ELECTRONIC POSTAGE METER OPERATING VOLTAGE VARIATION SENSING SYSTEM

[75] Inventor: Arno Muller, Westport, Conn.
[73] Assignee: Pitney Bowes Inc., Stamford, Conn.
[21] Appl. No.: 89,434
[22] Filed: Oct. 30, 1979
[51] Int. Cl.³ .............................................. G06F 1/00
[52] U.S. Cl. .................................................... 364/900
[58] Field of Search ...................................... 235/92 FP; 364/200 MS File, 900 MS File, 464, 466; 365/228, 229

[56] References Cited

U.S. PATENT DOCUMENTS

| | | | |
|---|---|---|---|
| 3,602,910 | 8/1971 | Kofsky | 365/228 |
| 3,676,717 | 7/1972 | Lockwood | 365/228 X |
| 3,771,148 | 11/1973 | Aneshansley | 365/228 |
| 3,801,963 | 4/1974 | Chen | 364/200 |
| 3,810,116 | 7/1974 | Prohofsky | 364/200 |
| 3,859,638 | 1/1975 | Hyme, Jr. | 365/229 |
| 3,938,095 | 10/1976 | Check, Jr. et al. | 364/200 |
| 3,959,778 | 5/1976 | Brette | 364/200 |
| 3,978,457 | 8/1976 | Check, Jr. et al. | 364/200 |
| 3,980,935 | 9/1976 | Worst | 365/229 |
| 4,049,951 | 9/1977 | Baty | 235/92 FP |

Primary Examiner—Harvey E. Springborn
Attorney, Agent, or Firm—David E. Pitchenik; William D. Soltow, Jr.; Albert W. Scribner

[57] ABSTRACT

An electronic postage meter includes an operating voltage variation sensing system. Protection is provided for preserving postage accounting information stored in the meter if the operating power for the meter fails. Control circuits are connected to the accounting circuit and to circuitry providing signal information representative of the power condition. The control circuit operates to maintain the accounting circuit in either an operative or inoperative state. The control circuits can be set to bring the accounting circuit from the inoperative state only when the signal information reflects a sufficient power condition. Once set to maintain the accounting circuit in the operative state, the control circuits continue to maintain the accounting circuit operative, independent of signal information reflecting a power failure.

5 Claims, 3 Drawing Figures

ELECTRONIC POSTAGE METER OPERATING VOLTAGE VARIATION SENSING SYSTEM

FIELD OF THE INVENTION

The present invention relates to operating voltage variation sensing systems and more particularly to operating voltage sensing systems for electronic meters adapted to print and account for postage.

BACKGROUND OF THE INVENTION

Electronic postage meters have been developed with electronic accounting circuitry. Postage meter systems of this type are disclosed in U.S. Pat. No. 3,978,457 for Microcomputerized Electronic Postage Meter System and in U.S. Pat. No. 3,938,095 for Computer Responsive Postage Meter. The electronic accounting circuits include memory capability to store postage accounting information. This information includes, for example, the amount of postage remaining in the meter for subsequent printing. Other types of accounting or operating data may also be stored in the memory. The memory function in the electronic accounting circuits have replaced the function served in postage meter by mechanical accounting registers. Postage meters with mechanical accounting registers are not subject to many of the problems encountered by electronic postage meters. Conditions cannot normally occur in postage meters with mechanical registers that prevent the accounting for a printing cycle or which result in the loss of data stored in the registers. This, however, is not the case with electronic postage meters.

It has been recognized that conditions can occur in electronic postage meters where information stored in the electronic accounting circuits can be permanently lost. The lost data can result in a loss of information representing the postage funds stored in the meter. Since data of this type changes with the printing of postage and is not stored elsewhere outside of the meter, there is no way to recover or reconstruct the lost information. As a result, a user may suffer a loss of postage funds if the data in the electronic accounting circuit is lost. One condition which can cause permanent loss of accounting information in electronic postage meters is a failure of the electrical operating power supplied to the meter. Where a power failure occurs the operating voltage supplied to the accounting circuitry likewise fails and the information stored in the memory may be lost.

Systems have been designed to preserve information stored in electronic memory units when power fails. Examples of systems of this type are shown in U.S. Pat. No. 3,859,638 for a Non-Volatile Memory Unit With Automatic Standby Power Supply; U.S. Pat. No. 4,049,951 for Data Detection Apparatus; and U.S. Pat. No. 3,676,717 for Non-Volatile Flip-Flop Memory Cell. These systems, in part, involve sensing power failure and taking measures to insure data is not lost such as by employing an axilliary standby power supply or by loading the data into a non-volatile memory. Other U.S. patents which show systems to protect stored information are U.S. Pat. No. 3,801,963 for Method and Apparatus for Transferring Data from a Volatile Data Store Upon the Occurence of a Power Failure in a Computer; U.S. Pat. No. 3,959,778 for Apparatus for Transferring Data from a Volatile Main Memory to a Store Unit Upon the Occurence of an Electrical Supply Failure in a Data Processing System; U.S. Pat. No. 3,810,116 for Volatile Memory Protection; and U.S. Pat. No. 3,980,935 for Volatile Memory Support System.

Power failure protection systems have been incorporated in electronic postage meter systems. A postage meter power failure protection system is shown and described in U.S. Pat. No. 3,978,457 for Microcomputerized Electronic Postage Meter System. In this system, when a voltage drops below a threshold level, a signal is generated which initiates a shut down routine. As part of the shut down routine, the contents of a working random access memory are transferred to a non-volatile memory. The maximum time to detect the shut down signal and the time to transfer the register contents from the work memory to the non-volatile memory is a function of the circuit components, including the power supply filter capacitors. It is recognized that during "power-up" and "power-down" the microprocessor is not functioning predictably and that the memory must therefore be protected. The protection is accomplished by gates circuit. This system is very satisfactory and properly performs the desired function.

SUMMARY OF THE INVENTION

The present invention provides an improved voltage sensing system. Improved protection is provided against unpredictable circuit operation when power failure occurs. The protection is afforded even when the power failure is temporary and less than a total failure. This situation is of particular concern regarding its effects on the accounting data stored in the meter. The present invention, however, insures the integrity of the stored accounting data resident in the meter when power is fully restored after such power failures.

A postage meter system employing the present invention includes accounting means operatively coupled to a postage printing means. The accounting means accounts for postage printed by the printing means. The accounting means has an operative state and an inoperative state. Means are operatively coupled for sensing the voltage level of a source of operating voltage. The sensing means provide signal information representative of the voltage level of the source of operating voltage. Means couple the sensing means to the accounting means for applying signal information representative of the voltage level of the operating voltage to the accounting means. Accounting control means are coupled to the signal information applying means and to the accounting means. The account control means maintains the accounting means in one of the operative or the inoperative states and maintains the accounting means in the operative state independent of the signal information representative of the voltage level of the source of operating voltage.

In accordance with a feature of the present invention, memory means are operatively coupled to the accounting means. The memory means have a first condition wherein information stored in the memory can be changed and a second condition wherein information stored in the memory cannot be changed. Memory control means are coupled to the memory means for maintaining the memory in one of the first memory condition or the second memory condition. The memory control means are operative to maintain the memory in the second condition when the accounting control means is operative to maintain the accounting means in the inoperative state.

DESCRIPTION OF THE DRAWINGS

A complete understanding of the present invention may be obtained from the following detailed description thereof, when taken in conjunction with the accompanying drawing, in which.

DETAILED DESCRIPTION OF THE INVENTION

Figures 1A, 2:
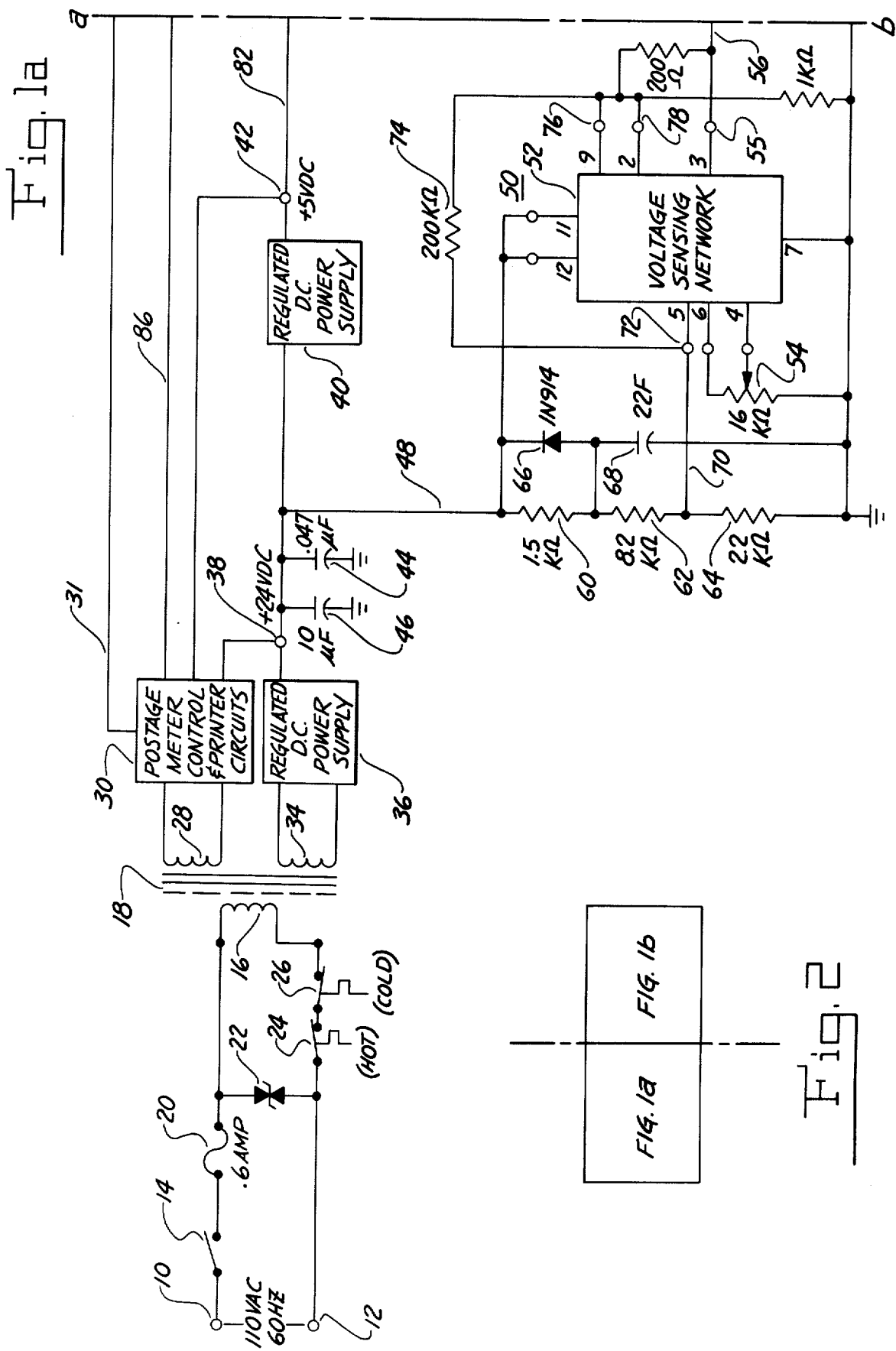
FIGS. 1a and 1b, when taken together, are a complete schematic circuit diagram of an electronic postage meter operating voltage variation sensing system embodying the present invention.
FIG. 2 is an interconnection diagram of the schematic circuit diagrams of FIG. 1a and FIG. 1b.
Figure 1B:
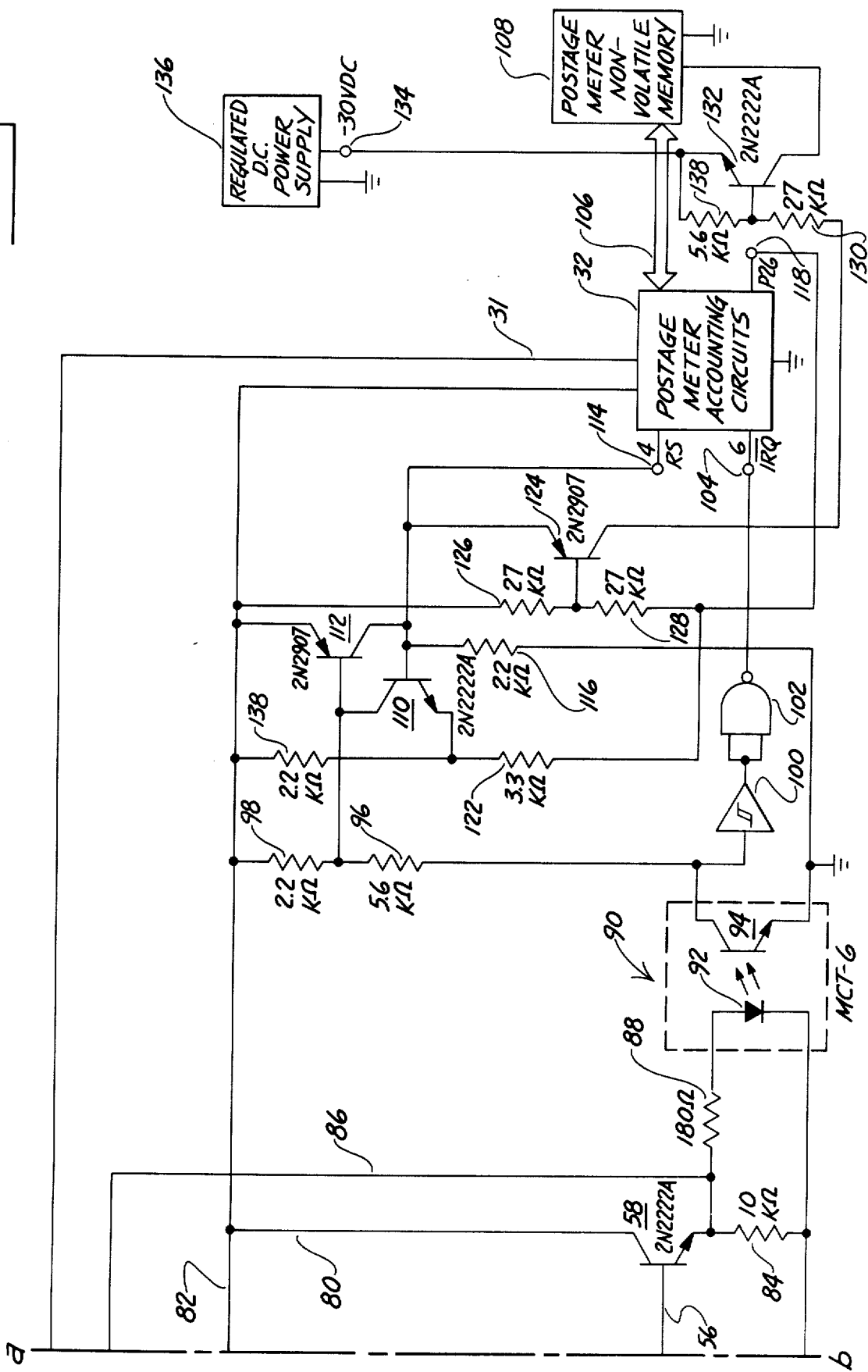

Reference is now made to FIGS. 1a and 1b. These schematic circuit diagrams are interconnected into a complete schematic circuit diagram of an electronic postage meter operating voltage variation sensing system as shown in the interconnection diagram of FIG. 2. A 110 volt, 60 hertz AC source, not shown, is applied across the postage meter main power terminals 10 and 12. The alternating voltage is applied via the postage meter on/off switch 14 across the primary winding 16 of a transformer 18. A fuse 20 is provided to protect against drawing excessive currents through the primary winding 16. Protection against transient spike voltages is provided by by-directional zener diode 22 which clips voltage spikes which may develop across the primary winding 16.

Two thermally actuated switches are connected in series with the primary winding 16 to turn the electronic postage meter off in the event of extreme temperature conditions. Thermal switch 26 is opened to disable the system when the temperature exceeds a high level such as 65° C. Thermal switch 24 is opened when the temperature drops below a low level such as 0° C. If either thermal switch 24 or 26 are actuated to open or, if the electronic postal meter on/off switch 14 is actuated to open, the operating voltage variation sensing circuitry will be actuated, as hereinafter described, in the same manner as if the 110 AC source failed.

The secondary winding 28 of transformer 18 is coupled to the electronic postage meter control and printer circuits 30. These circuits as well as the postage meter accounting control circuits 32 may be similar to the circuitry shown in U.S. Pat. No. 3,978,457 for Micro-Computerized Electronic Postage Meter System and to the system shown in pending U.S. patent application Ser. No. 089,413, filed concurrently herewith for John Soderberg, Alton Eckert and Robert McFiggans, entitled Electronic Postage Meter Having Plural Computing Systems, and assigned to Pitney Bowes Inc. The secondary winding 28 provides AC power to the meter control and printing circuits 30. An additional secondary winding 34 is coupled to a conventional regulated DC power supply 36. The transformer 18 is of the type that includes shielding between the primary winding 16 and second windings 28 and 34 to help isolate the electronic postage meter accounting circuits from stray electromagnetic radiation.

The regulated DC power supply 30 provides a regulated +24 volt DC output potential at terminal 38. The regulated +24 volt DC is applied to a second regulated DC power supply 40 which is also of conventional design. The regulated DC power supply 40 provides a regulated +5 volt DC output at terminal 42. A capacitor 44 is connected to terminal 38 to provide a low impedance bypass to a point of fixed reference potential such as ground for high frequency transients occuring at terminal 38. A second capacitor 46 is also connected to terminal 38. Capacitor 46 provides temporary power required by sudden and temporary changes in load current due to stepped changes in load conditions. Additionally, capacitor 46 provides, in conjunction with other capacitances in this system, a source of temporary, although falling, power to energize the system should the voltage at terminal 38 fall.

The voltage developed at terminal 38 is applied via a lead 48 to a voltage level sensing circuit 50. The voltage sensing circuit 50 includes a voltage regulator integrated circuit 52. Circuit 52 is of a conventional design and may be, for example, a National Semiconductor Corporation precision voltage regulator type LM 723C shown in Linear Databook, 1978 Edition, National Semiconductor Corporation, pages 1-96 to 1-100. Other companies, such as Texas Instruments, Fairchild, Motorola and Signetics also manufacture 723 type integrated circuit regulators.

The regulator 52 is connected to form a voltage sensing circuit. The voltage on line 48 powers the circuit. The circuit contains an internal zener diode which establishes an internal voltage reference. The voltage developed on lead 48 is applied across a voltage dividing network including resistors 60, 62 and 64. The voltage on lead 48 proportionally reduced by resistors 60, 62 and 64 is internally compared against the reference which is established by the setting on a potentiometer 54. When the voltage on lead 48 exceeds the pre-determined value set by potentiometer 54 the output from the voltage sensing network on lead 56 is on, that is, at a high voltage level, which biases transistor 58 for conduction. When the voltage on lead 48 is below the level predetermined by potentiometer 54, the output from the voltage sensing network 52 switches off and a low voltage occurs on lead 56 causes transistor 58 to be biased out of conduction.

A series connected diode 66 and capacitor 68 are connected across the voltage dividing network. Capacitor 68 provides a delay to hold off application of a rising voltage on lead 48 via resistors 60, 62 and lead 70 to the voltage sensing input terminal 72. This allows other potions of the electronic postage meter system to become fully operative before a voltage develops on lead 72 which exceeds the predetermined level established by potentiometer 54. Thus, transistor 58 is not biased for conduction until the other portions of the electronic postage meter become fully operative. This prevents the postage meter accounting circuits 32 including the postage meter non-volatile memory from becoming operative before the other portions of the electronic postage meter are in full and quiescent operation.

In contrast the rising voltages, for falling voltages developed on a lead 48, diode 66 provides a direct low impedance discharge path for capacitor 68 to the positive plates of capacitors 44 and 46. As a result, there is no delay, when the voltage on lead 48 falls, in applying the voltage on lead 48 to voltage divider resistors 62 and 64 and sensing network input terminal 72. Thus, when the voltage on lead 48 falls to the set level below the predetermined level established by potentiometer 54, the voltage at terminal 55 and on lead 56 immediately falls to a level which biases transistor 58 out of conduction. A feedback resistor 74 is connected between voltage sensing input terminal 72 and voltage sensing network terminals 76 and 78. This provides a hysteresis which insures that the level of voltage which causes the output of the voltage sensing network to go on or high is greater than the voltage level required for the voltage sensing network to go off or low. The hysteresis function eliminates instabilities and provides positive levels of actuation for the voltage sensing network.

Transistor 58 is connected as an emitter follower. Operating voltage is applied to the collector electrode of transistor 58 via leads 80 and 82 from regulated DC power supply terminal 42. The voltage developed across the emitter resistor 84 is applied via lead 86 to the postage meter control and printer circuits 30. The signal developed on lead 86 is a ground level potential when transistor 58 is biased out of conduction and approximately +5 volts DC when transistor 58 is biased into conduction. The voltage on lead 86 which is high when the voltage on lead 48 exceeds the predetermined level and low when the voltage on lead 48 is the below the predetermined level by the set amount is used as an indication to the postage meter control and printing circuits of a voltage variation. The signal on lead 86 turns off circuits which could unnecessarily drain existing power which may otherwise be used to power the postage meter accounting circuits 32 during a power-down cycle.

The emitter electrode of transistor 58 is connected via resistor 88 to an optical coupling circuit 90. Optical coupling 90 provides electrical isolation between the postage meter accounting circuits 32 and other portions of the electronic postage meter. The voltage developed at the emitter electrode of transistor 58 is applied via the resistor to a light emitting diode (LED) 92 which is operatively coupled to a photo transistor 94. When current flows through LED 92, light from the diode incident on the base area of the photo transistor 94 causes transistor 94 to be biased into conduction. The optical coupler 90 which provides the function of an optical switch is of conventional design. The collector electrode of photo transistor 94 is connected by resistor 96, resistor 98 and lead 82 to the regulated DC power supply terminal 42 which provides operating potential for the transistor. The emitter electrode of transistor 94 is connected to grounds. The collector electrode of transistor 94 is also connected through a hysteresis buffer amplifier 100 and an inverter circuit 102 to terminal 104 of postage meter accounting control circuits 32. The hysteresis amplifier 100 may be a Texas Instruments type 74LS244. The inverter circuit 102 may be a 74L500. These circuits are shown in the TTL Data Book for Design Engineer, Second Edition, Copyright 1976, Texas Instruments Incorporated, pages 5-55, 6-83 to 6-86 and pages 5-6, 6-2 and 6-3.

Postage meter accounting circuits are connected by link 31 to the postage meter control and printer circuits 30, and include a microprocessor. As described in U.S. Pat. No. 3,978,457 the microcomputer of the postage meter accounting circuits 32 provides the accounting capability for the postage meter and includes a working memory as part of the system for accounting for postage printed by the meter. The information in the working memory during a power-down sequence is transferred via a communication channel diagrammatically shown as 106 to a non-volatile memory 108. The communications channel 106 may include input/output port expanders and other standard circuitry to control the flow of information. The function of transferring accounting information from a working to a non-volatile memory is described, in part, in column 10 of U.S. Pat. No. 3,978,457.

One suitable processor for use in the electronic postage meter is an Intel 8039 Microprocessor. The Intel 8039 microprocessors are described in the Intel MCS-48 Family of Single Chip Microcomputers—Users Manual, Copyright 1978-1979, Intel Corporation. Microcomputers of this type include an interrupt terminal to allow an interrupt sequence to be initiated by applying an appropriate signal. The interrupt line is continuously sampled and when an interrupt signal is detected, it initiates an interrupt. The interrupt is disabled after a reset is applied to a reset terminal. The reset in this type of microprocessor controls the output pins.

Two interconnected transistors 110, 112 and 124 are coupled between the photo transistor 94 and terminals 114 and 116 of the postage meter accounting circuits 32. Transistor 112 has its emitter-collector electrode current path connected between the postage meter accounting circuit reset terminal 114 and the +5 volt regulated DC power supply terminal 42. When power is applied to the electronic postage meter by the 110 volt 60 hertz source, the voltage levels begin to build within the regulated DC power supplies 36 and 40. Eventually, the voltage levels rise to a sufficient level such that, as previously described, photo transistor 94 is biased into conduction. At this time, the base electrode of transistor 112 is connected to ground via resistor 96 and the collector-emitter electrode current path of photo transistor 94 allowing transistor 112 to be biased into conduction. The resulting of voltage developed across resistor 116 is applied to the rest terminal 114 of the postage meter accounting circuits 32. The voltage applied to terminal 114 causes the postage meter accounting circuit to become operable and to provide a ground return path via terminal 118. As a result, a ground return path is provided for the emitter electrode of transistor 110 via resistor 122 and transistor 110 becomes biased into conduction.

Biasing transistor 110 into conduction causes transistor 112 to be latched in its conductive condition. That is, transistor 112 is biased into conduction regardless of whether photo transistor 94 is conducting. Should photo transistor 94 cease to be biased into conduction for any reason, transistor 112 will still remain biased into conduction. The base electrode return path for transistor 112 initially provided by photo transistor 94 is now also provided by the collector-emitter electrode current path of transistor 110.

The ground return path through terminal 118 also biases a transistor 124 into conduction. Base bias for transistor 124 is provided by the voltage developed at the junction of resistors 126 and 128. The transistor 124 has its emitter-collector electrode current path connected between the +5 volt DC regulated power supply terminal 42 and resistor 130 which is coupled to the base electrode of transistor 132. When transistor 132 is biased into conduction, it couples the postage meter non-volatile memory 108 to a −30 volt DC potential at terminal 134 of regulated DC power supply 136. The regulated DC power supply 136 may be energized by the 110 volt AC source. The application of the −30 volt DC potential to the postage meter non-volatile memory renders the non-volatile memory operable. One suitable nonvolatile memory device is a General Instruments Corporation type ER 3400 NMOS device shown in Electrically Alterable Read Only Memories, Section 4A, June 1979, General Instrument Corporation, pages 4-34 to 4-37.

Memory devices of this type require operating voltages to enable the device to interact in a read/write mode with the postage meter accounting circuits. Thus, when operating voltage is removed from the nonvolatile memory 108, the information stored in the memory cannot be erased or changed. A resistor 138 is connected between the base and emitter electrodes of transistor 132 to insure a positive turn-off of transistor 132 when transistor 124 is no longer biased into conduction.

During a power failure of the 110 volt AC source or when any of the switches of the electronic postage meter are open, specifically, on/off switch 14 or thermally actuated switches 24 or 26, the voltage output from the regulated DC power supplies 36 and 40 begin to drop. When the voltage developed on lead 48 falls below the predetermined threshold level for turn-off, transistor 58 will be biased out of conduction and current will cease following through light emitting diode 92. Photoconductor 94 as a result becomes biased out of conduction. The collector electrode of photo transistor 94 rises toward the +5 volt DC level at terminal 42. The voltage at the collector electrode of photo transistor 94 is coupled through the hysteresis buffer amplifier 100 and inverter 120 to apply a low level interrupt signal to terminal 104. This causes the microcomputer in the postage meter accounting control circuits to go into its powerdown cycle transferring the information in its working memory via communication link 106 to the non-volatile memory 108, similar to that described in U.S. Pat. No. 3,978,457. When that function is completed, the ground return via terminal 118 is interrupted. This causes transistors 110 and 112 which were previously biased for conduction independent of nonconducting photo transistor 94, to be biased out of conduction. Positive turn-off of transistor 110 is achieved by the voltage applied to the emitter electrode of the transistor by resistor 138. When transistor 110 becomes biased out of conduction, the base bias path of transistor 112 through the collector-emitter electrode current path of transistor 110, resistor 122 to ground through terminal 118 is removed. The base electrode of transistor 112 is then positively turned off by the voltage applied to its base electrode via resistor 98.

When the ground return at terminal 118 is removed, transistor 124 is also, simultaneously with transistors 110 and 112, biased out of conduction. As a result, transistor 132 is biased out of conduction and the −30 volt DC operating potential at terminal 134 is decoupled from the postage meter non-volatile memory 108. This prevents the information stored in the memory from being erased or changed.

The latching of transistor 112 allows the interrupt signal to be applied to the postage meter accounting circuit terminal 104 to initiate a power-down sequence without biasing transistor 112 out of conduction until the power-down cycle is fully completed. Although it is not necessary to accommodate temporary voltage fluctuations which cause photo transistor 94 to be biased out of conduction, flexibility in operation of the circuit may be provided should it be desired. For example, the postage meter accounting circuits can be conditioned to inspect the voltage applied to terminal 104 for a predetermined time prior to interrupting the ground return path on terminal 118. This would insure that the power failure condition exists for longer than a predetermined time before initiating the shutdown of the circuits. Nevertheless, the energy stored in capacitors 44 and 46 as well as other circuit components prevent the voltage on line 48 falling below the set level for short temporary power failures.

What is claimed is:

1. A postage meter system, comprising:

a source of operating voltage;

means for printing postage;

accounting means coupled to said source of operating voltage and to said postage printing means, said accounting means accounting for postage printed by said printing means, and said accounting means having an operative state and an inoperative state;

means coupled for sensing the voltage level of said source of operating voltage and providing signal information representative of the voltage level of said source of operating voltage, said signal information indicating whether said source voltage is above or below a voltage level required for proper operation of said postage meter system;

means connecting said sensing means to said accounting means for applying said signal information representative of the voltage level of said source of operating voltage to said accounting means;

accounting control means coupled to said voltage level signal applying means and said accounting means, said accounting control means having a first condition for maintaining said accounting means in said operative state and a second condition for maintaining said accounting means in said inoperative state, said accounting control means being switchable between said first and said second condition; and said accounting control means being switchable from said second condition to said first condition only when said signal information is representative of an operating voltage above said level for proper operation and said accounting control means being switchable from said first to said second condition, independent of said signal information representative of the voltage level of said source of operating voltage.

2. A postage meter system as defined in claim 1 further comprising:

memory means operatively coupled to said accounting means, said memory means having a first condition wherein information stored in said memory means can be changed and a second condition wherein information stored in said memory means cannot be changed;

memory control means coupled to said accounting control means and said memory means for switching said memory means between said first memory condition and said second memory condition; and said memory control means operated by said accounting control means to maintain said memory means in said second condition when said accounting control means is in said second condition for maintaining said accounting means in said inoperative state.

3. A postage meter system, comprising:

a source of operating voltage for said postage meter system;

means for printing postage;

accounting means operatively coupled to said source of operating voltage and to said postage printing means for accounting for postage printed by said printing means, said accounting means having an operative state and an inoperative state;

means operatively coupled for sensing the voltage level of said source of operating voltage and providing signal information representative of the level of said source of operating voltage;

means coupling said sensing means to said accounting means for applying said signal information representative of said level of said source of operating voltage;

a first transistor and a second transistor, said first and said second transistor each adapted to be biased into and out of conduction;

transistor coupling means interconnecting said first and second transistor to said accounting means;

said first transistor operable once biased into conduction to maintain said accounting means in said operative state; and said second transistor once biased into conduction operative to cause said first transistor to maintain said accounting means in said operative state independent of the signal information representative of the voltage level of said source of operating voltage.

4. A postage meter system as defined in claim 3 further comprising:

memory means operatively coupled to said accounting means having a first condition wherein information stored in said memory means can be changed and a second condition wherein information stored in said memory means cannot be changed;

a third transistor coupled to said first transistor and to said memory means for switching said memory means between said first memory condition and said second memory condition; and said third transistor operated by said first transistor to maintain said memory means in said second condition when said first transistor is biased out of conduction.

5. A postage meter system, comprising:

a source of operating voltage for said postage meter system;

means for printing postage;

accounting means coupled to said source of operating voltage and to said postage printing means, said accounting means accounting for postage printed by said printing means;

said accounting means including a first terminal which when energized causes said accounting means to be in an operative state, a second terminal which where energized causes said accounting means to initiate an interrupt operation and a third terminal for providing a current path to ground when said accounting means first terminal is energized to cause said accounting means to be in said operative state, said accounting means operable to interrupt said current path when an interrupt operation initiated by energization of said second terminal has been completed;

means coupled to said source of operating voltage for sensing the voltage level of said source of operating voltage and providing signal information representative of the level of said source of operative voltage;

means coupling said voltage sensing means and said accounting means second terminal for applying said signal information representative of the level of said source of operating voltage to said second terminal;

a first and second transistor, said first and said second transistor each having a base electrode, a collector electrode and an emitter electrode;

said first transistor collector-emitter electrode current path coupled between said accounting means first terminal and said source of operating voltage, and said first transistor base electrode connected to said means coupling said voltage sensing means and said accounting means second terminal; and said second transistor collector-emitter electrode current path coupled between the base electrode of said first transistor and said accounting means third terminal and said second transistor base electrode connected to said source of operating voltage.

* * * * *